March 27, 1951 B. M. WASSENAAR 2,546,204
HOG BRANK
Filed July 24, 1945
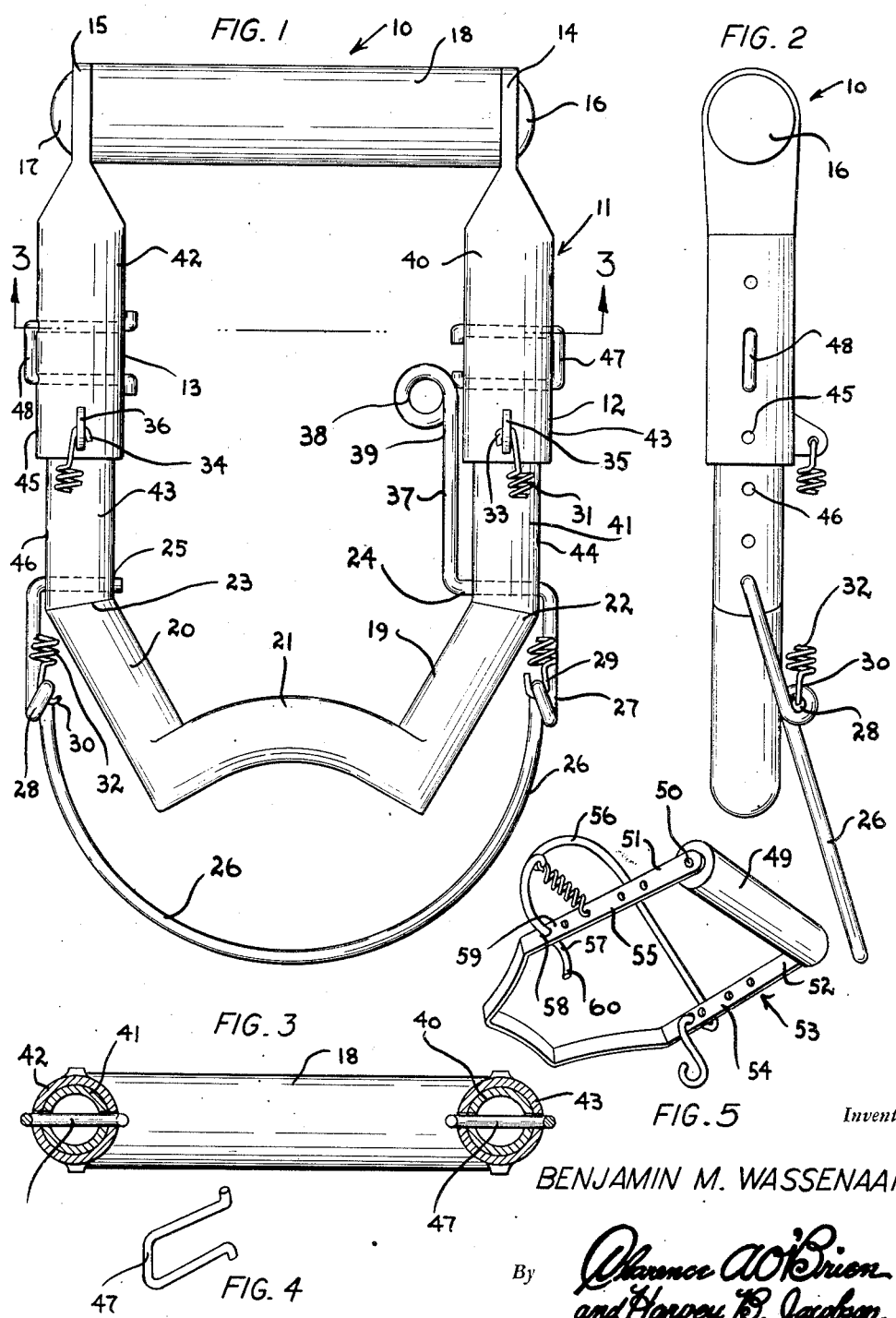
Inventor
BENJAMIN M. WASSENAAR
By Clarence A. O'Brien
and Harvey B. Jackson
Attorneys Patented Mar. 27, 1951

2,546,204

UNITED STATES PATENT OFFICE 2,546,204

HOG BRANK

Benjamin M. Wassenaar, Fulton, Ill.

Application July 24, 1945, Serial No. 606,740

2 Claims. (Cl. 119—151)

My invention relates to a brank or bridle for hogs and has for its object to provide a simple and positive means whereby an unruly hog may be controlled.

Another object of the invention is to provide an adjustable brank for a hog.

A further object of the invention is to provide a lever handle actuated bit whereby a hog may be controlled.

Other features and advantages will become more readily apparent from the following description and the accompanying illustrative drawings in which:

Figure 1 is an elevational view of my hog brank,

Figure 2 is a side elevational view thereof,

Figure 3 is a section on line 3—3 of Figure 1,

Figure 4 is a detail perspective view of a locking member, and

Figure 5 is a reduced perspective view of a modification.

The instant invention is an improvement of the hog catcher and holder as disclosed in my U. S. Patent 2,052,813 of September 1, 1936, and 10 indicates my herein disclosed brank which consists of a lever handle member 11, comprising a pair of spaced apart side members 12 and 13, the outer terminals 14 and 15 of which are provided with apertures to receive the pivot pins 16 and 17 of a rotatable handle 18. The lower ends 19 and 20 of members 12 and 13 are inwardly inclined and terminate in a bowed bridge piece 21 for seating over the snout of a hog. This member may be provided with a rubber or other padding to prevent cutting the animal.

Just above the elbows 22 and 23 of said members 12 and 13, are the pivot portions 24 and 25 of a bit member 26, which may be formed of heavy wire and which member is provided with coiled round or flat eyes 27 and 28 to receive the hooks 29 and 30 of coil springs 31 and 32, the terminals 33 and 34 of which are secured in eyes 35 and 36 of members 12 and 13, respectively. These springs have sufficient tension to hold the bit 26 within the mouth of a hog and prevent it from removing the same with its tongue.

The pivot element 24 terminates in a lever 37, normally aligning with the member 12, and which is provided with a thumb-engaging eye 38, at its outer end 39, whereby manual tension may be brought upon the bit 26, other than that of said springs 31 and 32, without having to resort to the use of the lever handle 11, which it is necessary to use only when the animal becomes unruly.

The members 12 and 13 are tubular in form and consist of telescopically connected sections 40 and 41, and 42 and 43, respectively, which sections are provided with alignable bores 43 and 44, and 45 and 46, respectively, for receiving the staple-like spring clips 47 and 48, whereby the length of member 11 may be adjusted for use with hogs of various sizes.

In Figure 5, I show a modification of the invention in which the handle 49 is pivoted by pin 50 to the upper ends 51 and 52 of a U-shaped bridle 53, formed of strap iron. The arms 54 and 55 are provided with a spring and a manually as well as lever actuated bridle 56, the terminal 57 of which is slidably held in bore 58, in the lower section 59 of arm 55 and is held from displacement by its bent end 60.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention that which I claim as new and desire to procure by Letters Patent is:

1. A hog holder including a handle portion having a pair of similar spaced lateral members, a snout engaging member generally U-shaped and connected to and between one pair of corresponding ends of said members, a bit provided on said snout engaging member and having an extending portion whereby said bit may be manually angularly adjusted relative to said snout engaging member, said handle lateral members being tubular and said snout engaging member being telescopically arranged therewith, each of said members having registrable apertures longitudinally arranged thereon, and clip means insertable in said apertures to retain said members in longitudinally adjustable relative relationship.

2. A hog holder including a handle portion having a pair of similar spaced lateral members, a snout engaging member generally U-shaped and connected to and between one pair of corresponding ends of said members, a bit provided on said snout engaging member and having an extending portion whereby said bit may be manually angularly adjusted relative to said snout engaging member, said members being relatively adjustable longitudinally and having a pair of extensible springs secured to and between said lateral members and said bit, whereby said adjustment may vary the normal angular relationship of said bit and thus vary the effective tension on said springs in use.

BENJAMIN M. WASSENAAR.

REFERENCES CITED

The following references are of record in the file of this patent:

UNITED STATES PATENTS

| Number | Name | Date |
|---|---|---|
| 662,960 | Payton | Dec. 4, 1900 |
| 824,402 | Betz et al. | June 26, 1906 |
| 1,041,841 | Milliner | Oct. 22, 1912 |
| 1,080,446 | Hickey | Dec. 2, 1913 |
| 1,915,454 | Steigenberger | June 27, 1933 |
| 2,052,813 | Wassenaar | Sept. 1, 1936 |
| 2,163,855 | Rapp | June 27, 1939 |

FOREIGN PATENTS

| Number | Country | Date |
|---|---|---|
| 593,459 | Germany | Feb. 27, 1934 |